United States Patent [19]

Goda et al.

[11] Patent Number: 5,073,408

[45] Date of Patent: Dec. 17, 1991

[54] METHOD OF DEPOSITING A SILICON DIOXIDE FILM

[75] Inventors: Takuji Goda; Hirotsugu Nagayama, both of Nishinomiya; Hideo Kawahara, Toyonaka, all of Japan

[73] Assignee: Nippin Sheet Glass Co., Ltd., Osaka, Japan

[21] Appl. No.: 580,356

[22] Filed: Sep. 7, 1990

Related U.S. Application Data

[63] Continuation of Ser. No. 338,503, Apr. 14, 1989, abandoned, which is a continuation of Ser. No. 869,423, Jun. 2, 1986, abandoned.

[30] Foreign Application Priority Data

Jun. 6, 1985 [JP] Japan .............................. 63-123254

[51] Int. Cl.$^5$ .............................................. B05D 5/06
[52] U.S. Cl. .................................. 427/169; 427/108; 427/345; 427/435; 427/443.2

[58] Field of Search ................ 427/169, 108, 73, 435, 427/443.2, 345

[56] References Cited

U.S. PATENT DOCUMENTS

| | | | |
|---|---|---|---|
| 2,490,662 | 12/1949 | Thomsen | 41/42 |
| 2,505,629 | 4/1950 | Thomsen et al. | 427/397.7 |
| 4,468,420 | 8/1984 | Kawahara et al. | 427/397.7 |

Primary Examiner—Janyce Bell
Attorney, Agent, or Firm—Varndell Legal Group

[57] ABSTRACT

A method of depositing a silicon dioxide film on the surface of a substrate such as alkali-containing glass by bringing the substrate into contact with a treating solution comprising a hydrosilicofluoric acid solution supersturated with silicon dioxide, which is obtained by increasing the temperature of a hydrosilicofluoric acid solution substantially saturated with silicon dioxide.

17 Claims, No Drawings

METHOD OF DEPOSITING A SILICON DIOXIDE FILM

This is a continuation of copending application(s) Ser. No. 07/338,503 filed on Apr. 14, 1989 which is a continuation of application Ser. No. 869,423, filed Jun. 02, 1986 now abandoned.

BACKGROUND OF THE INVENTION

1) Field of the Invention

The present invention relates to a method of depositing a silicon dioxide film and, more particularly, it relates to an improved method of depositing a silicon dioxide film on the surface of a substrate by bringing the substrate into contact with an aqueous solution of hydrosilicofluoric acid supersaturated with silicon dioxide.

2) Description of the Prior Art

It is widely carried out these days to coat the surfaces of various materials with silicon dioxide films. For example, it has been practiced for many years to reduce the reflection of a surface, e.g., a glass surface by applying an alternating multi-layered coating of titanium oxide films and silicon dioxide films on the surface. It is also practiced extensively to form a silicon dioxide coating as a protecting film on the surface of a metal or alloy. Besides, when an alkali metal-containing glass such as soda lime glass or borosilicate glass is used as liquid crystal display panel or solar battery substrate glass, the surface of such a glass is coated with silicon dioxide in order to avoid the elution of its alkali metal component or components. Prevention of the elution of the alkali metal component or components from glass has become a technique particularly indispensable for maintaining long a service life of liquid crystal display devices or solar batteries.

A variety of techniques has heretofore been employed to deposit silicon dioxide films on glass surfaces, including the vacuum deposition, sputtering, CVD and dip coating (dipping) techniques. These conventional techniques are, however, accompanied by such drawbacks that the formation of silicon dioxide films is costly as these conventional techniques require expensive facilities and accessories and, besides, they can be applied to small substrates only.

In contrast to the above techniques of depositing the silicon dioxide films, there is known a method, which can be effected with simple facilities and is capable of depositing the silicon dioxide film on a large substrate, and in which the silicon dioxide film is formed by deposition on the surface of a substrate by bringing the substrate into contact with a treating solution prepared by adding boric acid to an aqueous solution of hydrosilicofluoric acid substantially saturated with silicon dioxide. (See, for example, Japanese Patent Application Laid-open No.60-33233). This method will hereinafter be referred to as "liquid phase deposition method".

The principle of depositing a silicon dioxide film by the liquid phase deposition method is that, when the treating solution of hydrosilicofluoric acid solution substantially saturated with silicon dioxide is in the following equilibrium state:

$$H_2SiF_6 + 2H_2O \rightleftharpoons SiO_2 + 6HF \tag{1}$$

and boric acid is added to this treating solution, hydroborofluoric acid is then produced from boric acid and hydrofluoric acid in accordance with the following reaction:

$$H_3BO_3 + 4HF \rightarrow HBF_4 + 3H_2O \tag{2}$$

and, as a result of the consumption of hydrofluoric acid, the equilibrium in formula (1) proceeds to the right-hand side, and the amount of $SiO_2$ in the treating solution is increased to a supersaturation level, followed by the deposition of a film of $SiO_2$ on the surface of the substrate.

The above deposition method has advantages that the formation of the film is possible at a low temperature, and that it is possible to form films on substrates of any materials and any shapes, but it has disadvantage, on the other hand, that a complicated process is required for detoxifying treatment of the effluent of the used treating solution to be discarded.

In a fluorine-containing effluent, the fluorine is generally separated and removed as a $CaF_2$ precipitate formed by the addition of $Ca(OH)_2$. However, the fluorine concentration in the effluent produced in the conventional liquid phase deposition method cannot readily be decreased by single addition of $Ca(OH)_2$, and it is therefore necessary to repeat many times the cylcle of the addition of $Ca(OH)_2$, precipitation and separation.

SUMMARY OF THE INVENTION

Accordingly, it is an object of the present invention to provide a method of depositing a silicon dioxide film, wherein an apparatus used for depositing the silicon dioxide film is simple, the silicon dioxide film can be formed on a larger substrate, and a process required for detoxifying treatment of the effluent of the used treating solution to be discarded is not complicated.

According to the present invention, the above object is accomplished by a method of depositing a silicon dioxide film by bringing a substrate into contact with a treating solution comprising a hydrosilicofluoric acid solution supersaturated with silicon dioxide, to deposit a silicon dioxide film on the surface of the substrate, wherein the hydrosilicofluoric acid solution supersaturated with silicone dioxide is obtained by increasing the temperature of a hydrosilicofluoric acid solution substantially saturated with silicon dioxide.

The term "substantially saturated" as used herein means both "completely saturated" and "almost saturated". In the present invention, however, the hydrosilicofluoric acid solution substantially saturated with silicon dioxide is preferably the solution completely saturated with silicon dioxide.

Other and further objects, features and advantages of the present invention will appear more fully from the following decription.

DETAILED DESCRIPTION OF THE PREFERRED EMBODIMENT

The hydrosilicofluoric acid solution supersaturated with silicon dioxide is prepared by increasing the temperature of the hydrosilicofluoric acid solution substantially saturated with silicon dioxide, and the degree of the supersaturation can be adjusted by the degree of saturation and a temperature ($T_1$) before the increase in temperature, of the hydrosilicofluoric acid solution substantially saturated with silicon dioxide and a temperature ($T_2$) after the increase in temperature, of the same solution.

When the temperature ($T_2$) is increased to a temperature higher than 70° C., the generation of vapor of silicon tetrafluroide from the solution becomes vigorous, which undesirably causes degradation of working environment, a decrease in the concentration of the solution and an easy precipitation of silicon dioxide.

On the other hand, it is not desirable that the temperature ($T_1$) of the hydrosilicofluoric acid solution substantially saturated with silicon dioxide is higher than 35° C., because, even if the solution is in a completely saturated state, it is necessary to increase the solution temperature to a temperature higher than 70° C. for obtaining an industrially applicable rate of deposition of the silicon dioxide film.

When the increased amount ($T_2-T_1$) of the solution temperature is less than 10° C., the silicon dioxide film cannot be deposited on the surface of the substrate at an industrially applicable deposition rate. Therefore, it is preferred that the increased amount ($T_2-T_1$) is 10° C. or more.

The hydrosilicofluoric acid solution substantially saturated with silicon dioxide used in the present invention can be obtained by dissolving silicon dioxide (e.g., industrial silica gel or quartz glass) in a hydrofluoric acid solution. This hydrosilicofluoric acid solution may be at any concentration, although the concentration of 1 to 2 moles/l is preferable for obtaining an industrially applicable deposition rate.

It has been found that in the effluent treatment effected in the conventional method of depositing a silicon dioxide film the difficulty of decreasing the florine concentration is due to the presence of $HBF_4$($BF^-$ ions) in the effluent. The present invention has thus been made to provide a method of depositing a silicon dioxide film that does not produce any effluent which contains $HBF_4$.

The present invention utilizes the fact that the equilibrium of the solution represented by the following equation (1):

$$H_2SiF_6 + 2H_2O \rightleftharpoons 6HF + SiO_2 \quad (1)$$

proceeds to the right-hand side, when the temperature of the solution is increased. Accordingly, $HBF_4$ is not present in the effluent produced in the method of the present invention, and the effluent treatment is therefore much easier than conventional effluent treatment.

According to the present invention, since additive components are not added to the solution, the hydrosilicofluoric acid solution used once for deposition can be cooled to resaturate with silicon dioxide, and thus, the treating solution can be used again for depositing another silicon dioxide film. Heating and cooling of the solution can be repeated to dissolve, saturate and deposit the silicon dioxide in a closed system, thereby substantially eliminating the production of the effluent.

According to the present invention, since boric acid is not added to the hydrosilicofluoric acid solution, the used hydrosilicofuoric acid solution in the present method can easily be converted to a nontoxic solution as an effluent. In addition, since the solution used for the formation of the silicon dioxide film can be saturated again with silicon dioxide to reuse as a treating solution, the silicon dioxide film can be made with the effluent capable of being treated at a low cost, or without any effluent, and hence with a low production cost.

The present invention will be more clearly understood with reference to the following example; however, the example is intended to illustrate the invention and is not to be construed to limit the scope of the invention.

EXAMPLE

Three sheets of square soda lime glass plates each having a side length of 50 mm and a thickness of 1 mm were dipped in three types of solutions of hydrosilicofluoric acid supersaturated with silicon dioxide for 16 hours at 40° C., respectively, these solutions being prepared by heating to 40° C. the aqueous solutions containing 2 moles of hydrosilicofluroic acid per litre and saturated with silicon dioxide (industrial silica gel) at 15° C., 10° C. and 5° C., respectively. The deposition of silicon dioxide film was then confirmed.

The results are given in Table 1 below. It will be seen from Table 1 that, by controlling the temperature $T_1$ at which silicon dioxide in the aqueous solution of hydrosilicofluoric acid is present at a saturation concentration and the temperature $T_2$ at which the substrate is dipped in the treating solution to deposit the silicon dioxide film on the surface of the substrate, to meet the relationship, $T_1 < T_2$, the silicon dioxide films can be deposited without adding such additives (e.g. $H_3PO_3$) that will increase the degree of supersaturation of silicon dioxide.

TABLE 1

| Saturated Solution Temperature (°C.) | Film Thickness (nm) | Haze Rate (%) |
|---|---|---|
| 15 | 20 | 0.22 |
| 10 | 32 | 0.23 |
| 5 | 92 | 0.47 |

The haze rates of the films in Table 1 are the values measured for reference by cloud point measuring method (JIS, K-6714 (1977)) for methacrylate resin plates for aiplanes.

The effluent produced in the above deposition was diluted to 10 times its original volume, and $Ca(OH)_2$ was added thereto with stirring until the pH of the diluted effluent became 12. The resultant solution was filtered through a filter paper, and the concentration of fluorine in the filtrate measured by a fluorine ion meter was about 15 ppm.

The effluent produced in the conventional deposition method using addition of boric acid was similarly treated, giving the final concentration of fluroine of about 100 ppm. It has thus been found that the effluent in the method of the present invention is easy to detoxify.

What is claimed is:
1. A method for depositing a silicon dioxide film on a substrate comprising the steps of:
 (a) preparing a hydrosilicofluoric acid solution substantially saturated with silicon dioxide at a first temperature of not more than 15° C.,
 (b) increasing temperature of the solution prepared in step (a) to a second temperature at least 10° C. higher than the first temperature and obtaining a hydrosilicofluoric acid solution supersaturated with silicon dioxide to an extent necessary for depositing the silicon dioxide film on a surface of the substrate, and
 (c) contacting the substrate with the solution resulting from step (b) and depositing the silicon dioxide film on the surface of the substrate.

2. The method as set forth in claim 1, wherein the hydrosilicofluoric acid solution of step (b) is obtained without addition of external agents thereto.

3. The method set forth in claim 1, wherein the hydrosilicofluoric acid solution of step (b) is obtained without addition of a member selected from the group consisting of water, boric acid and sodium silicate.

4. The method set forth in claim 1, wherein the first temperature of step (a) is not more than 10° C.

5. The method set forth in claim 1, wherein the first temperature of step (a) is not more than 5° C.

6. The method as set forth in claim 1, wherein the contacting of step (c) is carried out at a temperature of not more than 70° C.

7. The method set forth in claim 2, wherein the first temperature of step (a) is about 15° C., the second temperature of step (b) is about 40° C. and the contacting of step (c) is at about 40° C.

8. The method set forth in claim 2, wherein the first temperature of step (a) is about 10° C., the second temperature of step (b) is about 40° C. and the contacting of step (c) is at about 40° C.

9. The method set forth in claim 2, wherein the first temperature of step (a) is about 5° C., the second temperature of step (b) is about 40° C. and the contacting of step (c) is at about 40° C.

10. A method for depositing of silicon dioxide film on a substrate comprising the steps of:
    (a) preparing a hydrosilicofluoric acid solution substantially saturated with silicon dioxide,
    (b) increasing temperature of the solution prepared in step (a) to a second temperature, where the first and second temperatures are selected so that a resulting hydrosilicofluoric acid solution at the second temperature is supersaturated with silicon dioxide to an extent necessary for depositing silicon dioxide on a surface of the substrate,
    (c) contacting the substrate with the solution resulting from step (b) and depositing the silicon dioxide film on the surface of the substrate,
    (d) cooling the solution resulting from step (c) and obtaining a hydrosilicofluoric acid solution unsaturated with silicon dioxide,
    (e) preparing the solution of step (a) by dissolving silicon dioxide from a source outside of the method into the solution resulting from step (d), and repeating steps (b) to (e).

11. The method set forth in claim 10, wherein the first temperature is not more than 15° C.

12. The method set forth in claim 11, wherein the difference between the first temperature and the second temperature is at least 10° C.

13. The method set forth in claim 12, wherein the hydrosilicofluoric acid solution of step (b) is obtained without addition of external agents thereto.

14. The method set forth in claim 10, wherein the hydrosilicofluoric acid solution of step (b) is obtained without addition of a member selected from the group consisting of water, boric acid and sodium silicate.

15. The method set forth in claim 10, wherein the first temperature of step (a) is about 15° C., the second temperature of step (b) is about 40° C. and the contacting of step (c) is at about 40° C.

16. The method set forth in claim 10, wherein the first temperature of step (a) is about 10° C., the second temperature of step (b) is about 40° C. and the contacting of step (c) is at about 40° C.

17. The method set forth in claim 10, wherein the first temperature of step (a) is about 5° C., the second temperature of step (b) is about 40° C. and the contacting of step (c) is at about 40° C.

* * * * *